United States Patent

[11] 3,605,024

[72] Inventor Kenneth E. Batcher
Stow, Ohio

[21] Appl. No. 42,186
[22] Filed June 1, 1970
[45] Patented Sept. 14, 1971
[73] Assignee Goodyear Aerospace Corporation
Akron, Ohio

[54] APPARATUS FOR SHIFTING DATA IN A LONG REGISTER
5 Claims, 3 Drawing Figs.

[52] U.S. Cl. .......... 328/37
[51] Int. Cl. .......... G11c 19/00
[50] Field of Search .......... 328/37; 307/221

[56] References Cited
UNITED STATES PATENTS

| | | | |
|---|---|---|---|
| 3,174,106 | 3/1965 | Urban | 328/37 |
| 3,239,764 | 3/1966 | Verma et al. | 328/37 |
| 3,350,692 | 10/1967 | Cagle et al. | 328/37 |
| 3,496,475 | 2/1970 | Arnold | 328/37 |

*Primary Examiner*—John S. Heyman
*Attorneys*—J. G. Pere and L. A. Germain

ABSTRACT: An improved shift register and interconnection of components related thereto is provided. With just two sets of connections between stages of a shift register of length $2^n-1$ where $n$ is a positive integer, any end-around shift can be performed with $n$ shift pulses. Modifications of the apparatus allow any register length with a slight loss in efficiency.

INVENTOR
KENNETH E. BATCHER

Oldham & Oldham
ATTORNEYS

| | | | | | |
|---|---|---|---|---|---|
| R1 | S1 | S8 | S15 | S11 | S10 |
| R2 | S2 | S1 | S4 | S13 | S11 |
| R3 | S3 | S9 | S8 | S15 | S12 |
| R4 | S4 | S2 | S12 | S2 | S13 |
| R5 | S5 | S10 | S1 | S4 | S14 |
| R6 | S6 | S3 | S5 | S6 | S15 |
| R7 | S7 | S11 | S9 | S8 | S1 |
| R8 | S8 | S4 | S13 | S10 | S2 |
| R9 | S9 | S12 | S2 | S12 | S3 |
| R10 | S10 | S5 | S6 | S14 | S4 |
| R11 | S11 | S13 | S10 | S1 | S5 |
| R12 | S12 | S6 | S14 | S3 | S6 |
| R13 | S13 | S14 | S3 | S5 | S7 |
| R14 | S14 | S7 | S7 | S7 | S8 |
| R15 | S15 | S15 | S11 | S9 | S9 |

INVENTOR
KENNETH E. BATCHER

BY: Oldham & Oldham
ATTORNEYS

APPARATUS FOR SHIFTING DATA IN A LONG REGISTER

Many problems for which an associative processor may be applicable require the transfer of operands between words. In many instances the requirement is to move each of a set of operands a given number of words up or down the memory (each operand moved the same amount). This can be accomplished by reading the operands into the response store, shifting the response store and then writing it back in memory. Long operands can be handled in pieces. To facilitate this, it is desirable to add a fast shifting capability to the response store.

A standard shift register consists of a row of flip-flops or other means for storing data with a connection from each flip-flop to its successor. The last flip-flop can be connected back to the first flip-flop of the row to get an "end-around" shift. Each shift will move the data one place cyclically. While being very simple, this method is slow when long shifts are called for; a shift of $n$ places requires $n$ shift pulses.

To speed up shifting one may add other connections to the register such as connecting each flip-flop to the flip-flop $r$ places down the line over another set of wires where $r$ is an integer not less than 2. Long shifts can be accomplished by shifting the data over the new connections a number of times and then over the old connections a number of times. Further speed increases can be obtained by adding still more connections, and this is all well known to those skilled in the art.

However, a new system is needed to provide for extremely long sequences and to effect data shifting thereof in a reasonable time period, and for a low system cost.

Therefore, it is the general object of the invention to provide a system utilizing just a few sets of connections between flip flops arranged so that any end-around shift of any number of places can be performed with a small number of operations. A further object of the invention is to provide a system to facilitate communications between response stores in an associative processor which takes the form of a long register.

Figure 2:
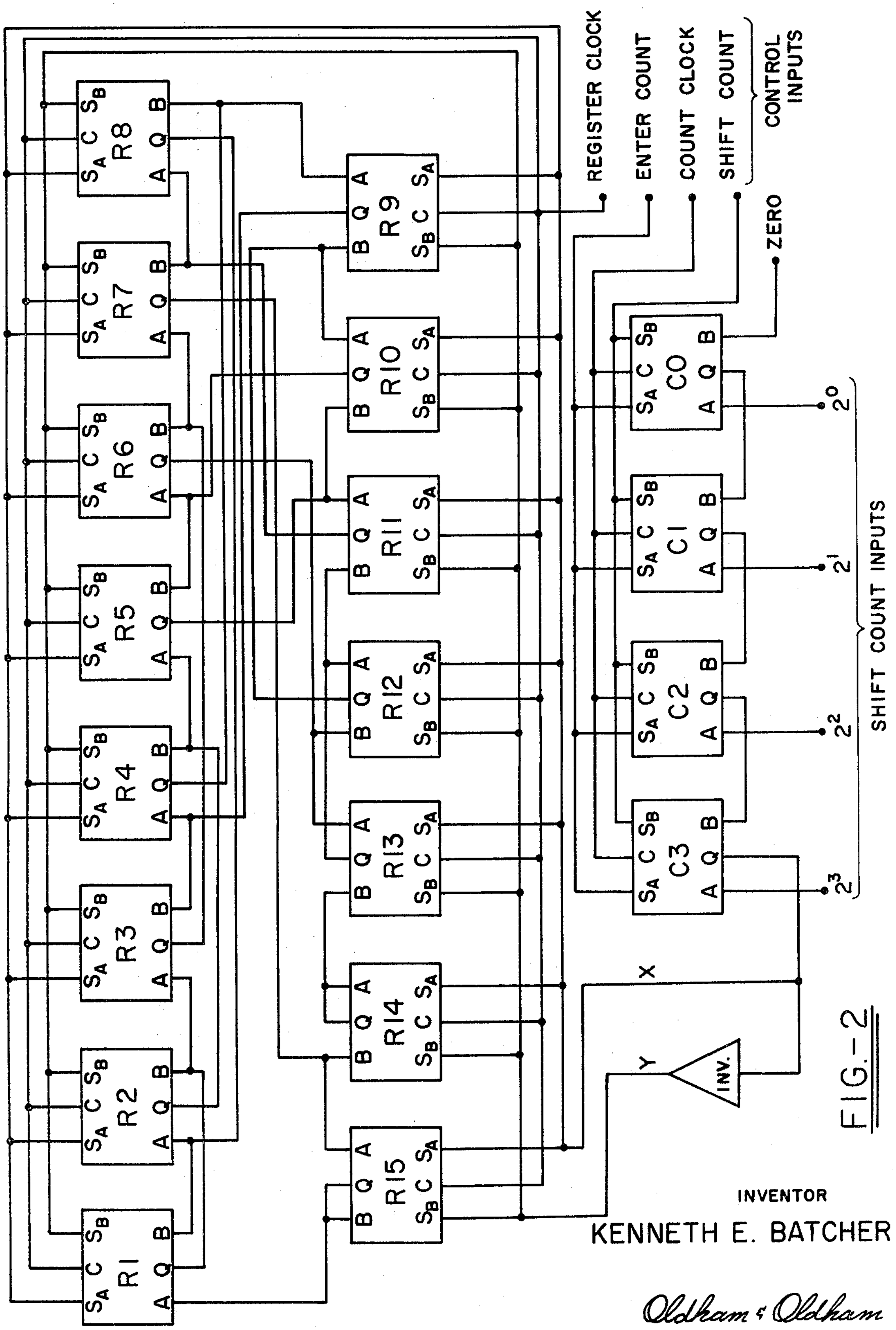
Figure 1:
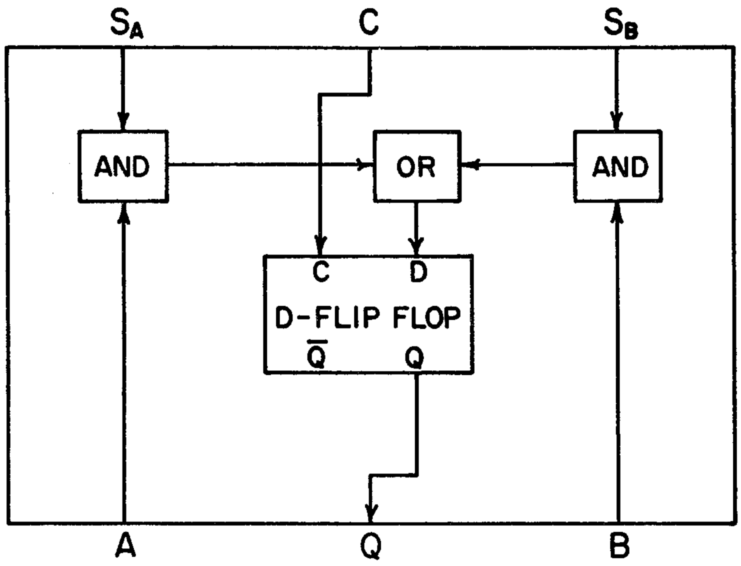
Figure 3:
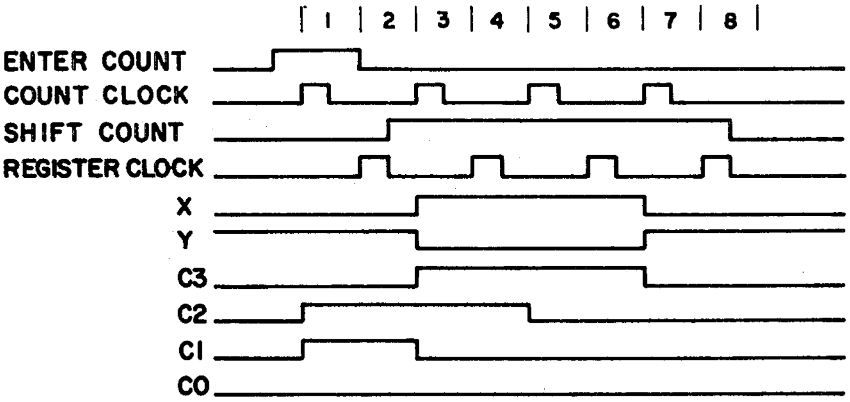

For a better understanding of the invention, reference should be had to the accompanying drawings wherein FIG. 1 is a block diagram of one small segment of the overall shift register;

FIG. 2 is an enlarged block diagram showing numerous solid state components arranged to perform the shift according to the invention in a 15-place register; and FIG. 3 is a graphic illustration of the pulse configurations, and showing how shifting is accomplished in the embodiment of FIG. 2.

FIG. 1 shows a typical two-input shift register stage made up of a D-flip-flop, two "AND" circuits and an "OR" circuit. The operation of the D-flip-flop is such that when the C input goes to the one state and returns to the zero state the state of the flip-flop Q, is set to the state of the D-input, either zero or one. The D-input of the D-flip-flop in FIG. 1 is fed by a two-input "OR" circuit whose inputs are the outputs of two two-input "AND" circuits. If the SA-input is one and the SB-input is zero then the state of the D-input follows the state of the A-input. If, conversely, the SA-input is zero an the SB-input is one then the D-input follows the state of the B-input. Thus, the SA and SB inputs select which of the two inputs, A or B, is fed to the D-flip-flop and thus select whether the D-flip-flop sets to the state of the A-input or the B-input when the C-input goes to the one state and returns to the zero state.

FIG. 2 illustrates a 15-bit shift register with the ability to shift any number of places end-around in four cycles. The idea can be extended to a shift register of $2^p-1$ bits where $p$ is any positive integer. Such a register has the ability to shift any number of places in $p$ cycles. For the more general case of $2^p-1$ bits the interconnection rule is that for all positive integers, $i$, less than $2^p$, the Q-output of stage R($i$) feeds the B-input of stage R($j$) and the A-input of stage R($k$) where $$j \equiv 2i \text{ MOD}(2^p-1)$$

and $$k \equiv 2i+1 \text{MOD}(2^p-1)$$

Stated another way:

1. If $i$ is a positive integer less than $2^{p11}$ then the Q-input of stage R($i$) feeds the B-input of stage R($2i$) and the A-input of stage R($2i+1$).
2. If $i$ is an integer greater than $2^{p11}-1$ and less than $2^p-1$ then the Q-output of stage R($i$) feeds the B-input of stage R($2i-2^p+1$) and the A-input of stage R($2i-2^p+2$).
3. The Q-output of stage R($2^p-1$) feeds the B-input of stage R($2^p-1$) and the A-input of stage R(1).

The rules can be combined into one rule using the notation of mathematical congruences. Garrett Birkhoff and Saunders MacLaine discuss congruences in Chapter 1 of "A Survey of Modern Algebra" published by the MacMillan Company of New York. For all positive integers, $i$, less than 16, the Q-output of stage R($i$) feeds the B-input of stage R($j$) and the A-input of stage R($k$) where $$j \equiv 2i \text{ (MOD 15)}$$

and $$k \equiv 2i+1 \text{ (MOD 15)}.$$

The shift count register contains four stages, C0, C1, C2, and C3 each of which could be a two-input shift register stage as shown in FIG. 1. The C-inputs of the four stages are connected to a COUNT CLOCK control input, the SA-selector inputs are connected to a ENTER COUNT control input and the SB-selector inputs are connected to a SHIFT COUNT control input. The four A-inputs of the stages are fed by four shift count input lines by which shift counts can be entered into the count register from an outside source. The shift count is a four-bit binary number in the range 0 to 15. The bit with weight $2^3$ feeds the C3 stage, the bit with weight $2^2$ feeds the C2 stage, the bit with weight $2^1$ feeds the C1 stage and the bit with weight $2^0$ feeds the C0 stage.

The B-input of stage C3 is fed from the Q-output of stage C2, the B-input of stage C2 is fed from the Q-input of stage C1, the B-input of stage C1 is fed from the Q-output of stage C0 and the B-input of stage C0 is fed by a line which continually stay in the zero state.

The Q-output of stage C3 feeds the X common line of the 15 bit shift register and an inverter whose output feeds the Y common line.

If the COUNT CLOCK control input goes to the one state and returns to the zero state while the ENTER COUNT control input is in the one state the four bit shift count register will be set to the states of the four shift count input lines. This will enter a shift count from the outside source. If the COUNT CLOCK control input goes to the one state and returns to the zero state periodically while the SHIFT COUNT control input is in the one state then the shift count register is shifted left end-off bringing the four bits of the shift count input in turn, most-significant-bit first, into stage C3 where they control in turn the states of the X and Y common lines.

FIG. 3 illustrates an example where the 15 bit shift register of FIG. 2 is shifted end-around six places in four clock cycles. Initially, stages C0, C1, C2 and C3 are in the zero state and the fifteen stages R1, R2, R3, ..., R15 contain a 15 bit pattern of ones and zeros represented by S1, S2, S3, ...S15. That is, the initial state of stage R$i$ is S$i$ for all positive integers, $i$, less than 16.

At time 1 the count clock control is raised and lowered while the ENTER COUNT control is in the one state. This causes a shift count to be entered into the count register C3, C2, C1 and C0. In this example the count is six (Binary 0110). C2 and C1 are set to the one state and C3 and C0 remain in the zero state. The X common line remains in the zero state and the Y common line remains in the one state.

At time 2 the register clock input is raised and lowered causing each of the 15 shift register stages R1, R2, R3, ..., R15 to set to the states of their respective B-inputs.

At time 3 the count register is shifted left one place by operating the COUNT CLOCK while the SHIFT COUNT control is raised. Stage C3 sets to the old state of stage C2, a "ONE" and common line X goes to the one state and common line Y goes to the zero state.

At the time 4 the register clock is operated again while X is in the one state and Y is in the zero state. The 15 shift register stages R1, R2, R3, ..., R15 set to the states of their respective A-inputs.

At time 5 the count register is shifted left one place again and stage C3, line X and line Y do not change state.

At time 6 the register clock is operated while X is in the one state and Y is in the zero state. The 15 shift register stages R1, R2, R3 ... R15 set to the states of their respective A-inputs.

At time 7 the count register is shifted left one place and stage C3, line X and line Y all change state.

At time 8 the register clock is operated again with line Y in the one state causing the 15 shift register stages to set to the states of their respective B-inputs.

After time 8, stage R7 is now set to S1, the original state of stage R1, stage R8 is now set to S2; stage R9 is now set to S3, and so on. Thus, the original states of stages R1, R2, R3, ..., R9 were moved to stages R7, R8, R9,...,R15, respectively and the original states of stages R10, R11, R12, ...,R15 were moved to stages R1, R2, ..., R6. The original pattern of ones and zeros was shifted six places with the last six bits moving end-around into the first six stages. Thus, an end-around SHIFT of SIX places was performed in accordance with the original shift count input of SIX.

If any four bit count from zero to 15 is entered into the shift count register at time 1, and if the enter count, count clock, shift count and register clock control inputs are operated as shown in FIG. 3, the 15 bit shift register will be shifted end-around the number of places specified by the count after time 8. (A shift of 15 places is equivalent to a shift of 0 places). Thus, any shift regardless of how many places can be performed in a fixed time interval and requires four-count register operations and four-shift register operations.

For a register of any length greater than "ONE" it is possible to find a simple apparatus which can perform an end-around shift of any amount in a few operations. The apparatus is described below.

Let $m$ be the number of stages in the register. Pick a small integer $r$ greater than unity which is relatively prime to $m$ (two positive integers are relatively prime if the only positive integer which divides evenly into both of them is unity). Pick a positive integer $n$ for which $r^n$ is greater than $m$. Integer $b$ is the smallest positive interger for which $br^n \equiv 1$ (MOD $m$).

Several different apparatus are possible with the aforementioned integers $m$, $r$, $n$ and $b$.

The first apparatus comprises three sets of connections between the stages with associated gating to enable a set when the register clock is operated. For each integer $i$ in the range 1 to $m$, the first set of connections connects the output of stage ($i$) to an input of stage ($j_1$), the second set connects the output of stage ($i$) to an input of stage ($j_2$) and the third set connects the output of stage ($i$) to an input of stage ($j_3$) where:

$j_1$ $ri$ (MOD $m$) ≡

$j_2$ $i+1$ (MOD $m$) ≡ and $j_3$ $bri$ (MOD $m$). ≡

Let $d_0, d_1, d_2..., d_n-1$ be any set of $n$ integers in the range 0 to $r-1$ and let $S=r^{n11}d_{n11}+r^{n12}d_{n12}+r^{n13}d_{n13}+...+r^1d_1+r^0d_0$. An $n-3$ end-around shift of $S$ places can be performed by operating the register CLOCK once with the third set of connections enabled and $d_{n11}$ times with the second set of connections enabled, then once with the first set of connections enabled, $d_{n12}$ times with the second set of connections enabled, once with the first set of connections enabled, $d_{n13}$ times with the second set of connections enabled, and so on using all the integers $d_{n12}$, $d_{n13}$, $d_{n14}$,..., $d_1 n+d_{n11}+d_{n12}+d_{n13}+...+d_1+d_0$ which is more than $nr$. The integer $S$ can equal any integer in the range 0 to $r^n-1$ since $r^n>$m any end-around shift can be performed with this scheme.

By trying successive positive integers one can find an integer $n$ satisfying $r^n$ 1 (MOD m) and $r^n>m$. With this choice of $n$ we obtain $b=1$ and the first set of connections in the first apparatus performs the same functions as the third set so the third set can be eliminated and the first set used in its place. Only two sets of connections are needed then. This simplification in hardware may increase the time to perform shifts since to minimize the number of register clock operations $n$ should be the smallest integer satisfying $r^n>m$.

The second apparatus comprises $r+I$ sets of connections between the stages with associated gating to enable a set when the register clock is operated. For each integer $i$ in the range 1 to $m$ and for each integer $k$ in the range 1 to $r$ the $k^{th}$ set of connections connects the output of stage $i$ to an input of stage $j$ where $j$ $ri+k-1$ (MOD $m$). For each integer $i$ in the range 1 to $m$ the $r+1^{th}$ set connects the output of stage $i$ to an input of stage $j$ where $j$ $bi$ (MOD $m$).

Let $S=r^{n11}d_{n11}+r^{n12}d_{n12}+r^{n13}d_{n13}+...+r^1d,+r^0d_0$ where each integer, $d_0$, $d_l$, ...,$d_{n11}$ is in the range 0 to $r-1$. An end-around shift of $S$ places can be performed by operating the register clock once with the $r+1^{th}$ set of connections enabled, then once with the $1+d_{n1}1$set of connections enabled, once with the $1+d_{n12}{}^{th}$ set of connections enabled, once with the $1+d_{n13}{}^{th}$ set of connections enabled, and so one for each of the integers $d_{n11}$, $d_{n12}$, $d_{n13}$, ..., $d_1$, $d_0$ in order. The number of register clock operations is $n+1$.

As with the first apparatus a simplification occurs in the second apparatus if $n$ is chosen to make $b=1$. If $b=1$ the $r+1^{th}$ set of connections can be eliminated since it then connects each stage back to itself so it has no effect when it is enabled. The first clock operation of the aforementioned sequence can be eliminated. There are $r$ sets of connections and $n$ clock steps required to perform any end-around shift.

If $r=2$ the second apparatus is preferred since it has the same number of sets of connections as the first apparatus and requires less operations to perform any end-around shift.

Hence, it is seen that the objects of the invention have been achieved by providing a system of arrangement of components in a long register to achieve simplified shifting of data therein, as well as reduced expense because of reduced number of components in the register.

While in accordance with the Patent Statutes only the best known embodiment of the invention has been illustrated and described in detail, it is to be particularly understood that the invention is not limited thereto or thereby, but that the inventive scope is defined in the appended claims.

What is claimed is:

1. Apparatus for shifting data in a register which comprises a plurality of shift register units greater than fourteen and less than some integral power of a positive integer which is relatively prime to the number of units, each unit having a storage device for storing data, three data inputs and means for selecting anyone of the three data inputs and setting the state of the storage device to the state of the selected input, means for selecting in common either the first data input of every unit, the second data input of every unit or the third data input of every unit so that the storage device of each unit can be set to the state of its selected input, interconnection means for transmitting the stored state of each shift register unit to the first data input of the same unit or another unit according to the following:

for each positive integer, $i$, not greater than the number of units, the stored state of the $i^{th}$ unit is transmitted to the first data input of the $j^{th}$ unit where $j$ is the positive integer not greater than the number of units such than $j$ itself or the sum of $j$ and the number of units or the sum of $j$ and some multiple of the number of units equals the product of $i$ and the aforementioned integer relatively prime to the number of units, interconnection means for transmitting the stored state of the $i^{th}$ unit to the second data input of the $i+1^{th}$ unit for each positive integer $i$ less than the number of units and for transmitting the stored state of the last unit to the second data input of the first unit, and interconnection means for transmitting the stored state of each shift register unit to the third data input of the same unit or another unit according to the following:

for each positive integer, $i$, not greater than the number of units the stored state of the $i^{th}$ unit is transmitted to the third data input of the $j^{th}$ unit where $j$ is the positive integer not greater than the number of units such that $j$ itself or the sum of $j$ and the number of units or the sum of $j$ and some multiple of the number of units equals the product of $i$ and the aforementioned integer relatively prime to the number of units and the particular positive integer less than the number of units which particular integer when multiplied by the aforementioned integral power of the aforementioned integer relatively prime to the number of units yields a product which equals either the sum of one and the number of units or the sum of one and a multiple of the number of units, and means to coordinate the means for selecting with the interconnection means on a timing cycle to effect shifting of data among the shift register units.

2. Apparatus for shifting data in a register which comprises a plurality of shift register units greater than 14, where either the number of units or a multiple of the number of units equals an integral power of an integer less one, each unit having a storage device for storing a state, two data inputs and means for selecting either of the two data inputs and setting the state of the storage device to the state of the selected input, means for selecting in common either the first data input of every unit, or the second data input of every unit so that the storage device of each unit can be set to the state of its selected input, interconnection means for transmitting the stored state of each shift register unit to the first data input of the same unit or another unit according to the following:

for each positive integer, $i$, not greater than the number of units the stored state of the $i^{th}$ unit is transmitted to the first data input of the $j^{th}$ unit where $j$ is the positive integer not greater than the number of units such that $j$ itself or the sum of $j$ and the number of units or the sum of $j$ and some multiple of the number of units equals the product of $i$ and the aforementioned integer with an integral power equal to the sum of one and the number of units or the sum of one and a multiple of the number of units, and interconnection means for transmitting the stored state of the $i^{th}$ unit to the second data input of the $i1^{th}$ unit for each positive integer $i$ less than the number of units and for transmitting the stored state of the last unit to the second data input of the first unit.

3. Apparatus for shifting data in a register which comprises a plurality of shift register units greater than 14 and less than some integral power of a positive integer which is relatively prime to the number of units, each unit having a storage device for storing a state, a number of data inputs which number is the aforementioned integer and means for selecting anyone of the data inputs and setting the state of the storage device to the state of the selected input, means for selecting in common corresponding inputs of all units, interconnecting means for transmitting the stored state of each shift register unit to certain data inputs of certain units according to the following:

for each positive integer, $i$, not greater than the number of units, and for each positive integer, $k$, not greater than the aforementioned integer which is relatively prime to the number of units, the stored state of the $i^{th}$ unit is transmitted to the $k^{th}$ data input of the $j^{th}$ unit where $j$ is the positive integer not greater than the number of units such that $j$ itself or the sum of $j$ and the number of units or the sum of $j$ and some multiple of the number of units equals the sum of two quantities one quantity is $k$ minus one and the other quantity is the product of $i$ and the aforementioned integer, and interconnecting means for transmitting the stored state of each shift register unit to the last data input of the same unit or another unit according to the following:

for each positive integer, $i$, not greater than the number of units the stored state of the $i^{th}$ unit is transmitted to the last data input of the $j^{th}$ unit where $j$ is the positive integer not greater than the number of units such that $j$ itself or the sum of $j$ and the number of units or the sum of $j$ and some multiple of the number of units equals the product of $i$ and the particular positive integer less than the number of units which particular integer when multiplied by the aforementioned integral power of the aforementioned integer relatively prime to the number of units yields a product which equals either the sum of one and the number of units or the sum of one and a multiple of the number of units, and means to coordinate the means for selecting with the interconnection means on a timing cycle to effect shifting of data among the shift register units.

4. Apparatus for shifting data in a register which comprises a plurality of shift register units greater than fourteen where either the number of units or a multiple of the number of units equals an integral power of an integer less one each unit having a storage device for storing a state, a number of data inputs which number is the aforementioned integer with an integral power equal to the sum of one and the number of units or the sum of one and a multiple of the number of units and means for selecting anyone of the data inputs and setting the state of the storage device to the state of the selected input, means for selecting in common corresponding inputs of all units, interconnecting means for transmitting the stored state of each shift register unit to certain data inputs of certain units according to the following:

for each positive integer, $i$, not greater than the number of units and for each positive integer, $k$, not greater than the aforementioned integer which is relatively prime to the number of units, the stored state of the $i^{th}$ unit is transmitted to the $k^{th}$ data input of the $j^{th}$ unit where $j$ is the positive integer not greater than the number of units such that $j$ itself or the sum of $j$ and the number of units or the sum of $j$ and some multiple of the number of units equals the sum of two quantities one quantity is $k$ minus one and the other quantity is the product of $i$ and the aforementioned integer with an integral power equal to the sum of one and the number of units or the sum of one and a multiple of the number of units.

5. Apparatus for shifting data in a long register which comprises a plurality of three input shift register units equal to the number of shift stages desired where such number is 15, each unit having at least an A, B and Q output, and a SA, C and SB input, means connecting a register clock control input common to the C input of each unit, means connecting the Q output of each unit to the A-input of one unit and the B-input of another unit according to the following:

1. If $i$ is a positive integer less than eight then Q output of unit $R(i)$ feeds the B-input of unit $R(2i)$ and the A-input of unit $R(2i)$;
2. If $i$ is a positive integer greater than seven and less than 15 then the Q output of unit $R(i)$ feeds the B-input of unit $R(2i-15)$ and the A-input of unit $R(2i-14)$; and
3. The Q output of the last unit feeds the B-input of the last unit and the A input of the first unit;

a shift count register having stages C0 to C3 and having the same inputs and outputs as the units, means connecting the C-inputs of the shift count register to a clock count control input, means connecting the SA inputs of the shift count register to an enter count control input, means connecting the SB inputs of the shift count register to a shift count control input, means to enter four-bit binary numbers in a range equal to the number of units into the A-input of each stage of the shift count register, means connecting the Q output of stage C2 to the B-input of stage C3, means connecting the Q-output of stage C1 to the B-input of stage C2, means connecting the Q-output of stage C0 to the B-input of stage C1, and means feeding the B-input of stage C0 with a constant zero input, means connecting the Q-output of stage C3 to the SA input of all units, an inverter receiving the Q-output of stage C-3 and the SB input of all units, and means to control a clock cycle on the count register according to the following sequence a. initiate an enter count b. during the enter count initiate a count clock, c. shift the stages in the count register by initiating a shift count and a count clock during the same time period, and d. shifting the register by initiating the register clock.

UNITED STATES PATENT OFFICE
CERTIFICATE OF CORRECTION

Patent No. 3,605,024 Dated September 14, 1971

Inventor(s) Kenneth E. Batcher

It is certified that error appears in the above-identified and that said Letters Patent are hereby corrected as shown below:

Col. 1, line 58, "an" should read -- and --.

Col. 2, line 2, "$2^{p11}$" should read -- $2^{p-1}$ --.

Col. 2, line 5, "$2^{p11}$" should read -- $2^{p-1}$ --.

Col 2, line 37, "stay" should be -- stays --.

Col. 3, line 58, "$S = r^{n11} d_{n11} + r^{n12} d_{n12} + r^{n13} d_{n13} + \ldots + r^1 d_1 + r^0 d_0$" should read -- $S = r^{n-1} d_{n-1} + r^{n-2} d_{n-2} + r^{n-3} d_{n-3} + \ldots + r^1 d_1 + r^0 d_0$ --.

Col. 3, line 61, "$d_{n11}$" should read -- $d_{n-1}$ --.

Col. 3, line 62, "$d_{n12}$" should read -- $d_{n-2}$ --.

Col. 3, line 64, "$d_{n13}$" should read -- $d_{n-3}$ --.

Col. 3, lines 65 and 66, after "integers", "$d_{n12}, d_{n13}, d_{n14}, \ldots, d_1\ n + d_{n11} + d_{n12} + d_{n13} + \ldots + d_1 + d_0$" should read -- $d_{n-2}, d_{n-3}, d_{n-4}, \ldots, d_1, d_0$ in order. The number of register clock operations is $n + d_{n-1} + d_{n-2} + d_{n-3} + \ldots + d_1 + d_0$ --.

Col. 3, line 71, "$r^n$ 1 (MOD m)" should read -- $r^n \equiv 1$(MOD m) --.

ol. 4, line 12, "j ri + k - 1 (MOD m)" should read -- $j \equiv ri + k - 1$ (MOD m) -- ol. 4, line 14, "j bi (MOD m)" should be -- $j \equiv bi$ (MOD m) --.

ol. 4, line 15, "$S = r^{n11}d_{n11} + r^{n12}d_{n12} + r^{n13}dn_{13} + \ldots + r^1 d_1 + r^0 d_0$ " should read -- $S = r^{n-1}d_{n-1} + r^{n-2}d_{n-2} + r^{n-3}d_{n-3} + \ldots + r^1 d_1 + r^0 d_0$ --.

ol. 4, line 16, "$d_{n11}$" should read -- $d_{n-1}$ --.

ol. 4, line 19, "$1 + d_{n1}1$" should read -- $1 + d_{n-1}{}^{th}$ --.

ol. 4, line 20, " $1 + d_{n12}{}^{th}$" should read -- $1 + d_{n-2}{}^{th}$ --.

ol. 4, line 21, "$1 + d_{n13}{}^{th}$" should read -- $1 + d_{n-3}{}^{th}$ --.

ol. 4, line 22, $d_{n11}$, $d_{n12}$, $d_{n13}$" should read -- $d_{n-1}$, $d_{n-2}$, $d_{n-3}$ --.

ol. 5, line 46, Claim 2, " $il^{th}$" should read -- $i + 1^{th}$ --.

ol. 6, line 67, Claim 5, "R(2i)" should read -- R (2i + i) --.

Signed and sealed this 28th day of March 1972.

(SEAL)
Attest:

EDWARD M.FLETCHER, JR.
Attesting Officer

ROBERT GOTTSCHALK
Commissioner of Patents